United States Patent [19]

De Bot

[11] 3,824,570

[45] July 16, 1974

[54] MAGNETO-OPTICAL TRANSDUCER USING BUBBLE DOMAINS

[75] Inventor: Laurentius Antonius Peter Maria De Bot, Emmasingel, Eindhoven, Netherlands

[73] Assignee: U.S. Philips Corporation, New York, N.Y.

[22] Filed: Mar. 12, 1973

[21] Appl. No.: 340,229

[30] Foreign Application Priority Data

Mar. 17, 1972 Netherlands ........................ 7203555

[52] U.S. Cl.340/174 YC, 340/174 CC, 340/174 QA, 340/174 TF

[51] Int. Cl. ......................... G11c 11/14, G11c 11/42

[58] Field of Search ............... 340/174 TF, 174 YC; 346/74 MT

[56] References Cited

UNITED STATES PATENTS 3,787,825 1/1974 De Jonge ..................... 340/174 YC

OTHER PUBLICATIONS

IBM Technical Disclosure Bulletin Vol. 13, No. 1, June 1970 pg. 147–148

IBM Technical Disclosure Bulletin Vol. 13, No. 2, July 1970 pg. 498–499

IBM Technical Disclosure Bulletin Vol. 13, No. 7, Dec. 1970 pg. 1788–1790

IBM Technical Disclosure Bulletin – Vol. 13, No. 12, May 1971 pg. 37, 8

*Primary Examiner*—James W. Moffitt

*Attorney, Agent, or Firm*—Frank R. Trifari; Carl P. Steinhauser

[57] ABSTRACT

A device for converting image information into magnetic information including a light source for projecting an image of the image information onto a plate of magnetic material capable of accommodating domains. A domain pattern is produced by the projection of the image information, as a result of the thermal action of the incident light, which is an image of the image information. Domain displacement means are provided by means of which the domain pattern thus obtained can be displaced, at least in parts, for reading purposes.

5 Claims, 5 Drawing Figures

MAGNETO-OPTICAL TRANSDUCER USING BUBBLE DOMAINS

Figure 1:
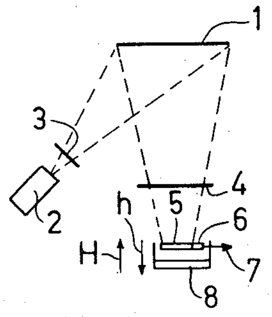

The invention relates to a device for converting image information into magnetic information, comprising a light source by means of which an image of the image information can be projected onto a plate.

There are many applications of devices in which image information is converted into electrical or magnetic information which can be readily processed and/or transported. In this context image information in a broad sense is meant, for example, information which is visible and interpretable to humans, but also other information which is not visible and/or directly interpretable to humans such as patterns of digital bit information in the form of punched card information and the like. An interesting field of application is image telegraphy. According to this method, an image is converted into an electrical signal and is transported. Many methods of converting the image are known, such as mechanical scanning, but particularly electro-optic scanning. A general drawback of all known converting devices of the kind set forth is the fact that they are complex and bulky. The aim is to obtain converting devices which can be used at a much wider scale. For example, so as to achieve house-to-house imgage telegraphy.

The results of investigations on magnetic domains in plates of magnetic material, in which the magnetization has a preferred orientation transverse to the plate and in which the domains have a magnetization in the opposite direction, offer the possibility of constructing an image converting device which is very simple and easy to handle. To this end, the said device for converting image information into magnetic information according to the invention is characterized in that the said plate is a plate of magnetic material which is suitable to accommodate domains, a domain pattern being produced by the projection of the image information, as a result of the thermal action of the incident light, the said domain pattern being an image of the image information, domain displacement means being provided by means of which the domain pattern thus obtained can be displaced, at least in parts, for reading purposes.

The desired image can be projected on a plate having an area of only a few square cm ($cm^2$). Projection can be effected by means of merely a light flash from a light source. The image information is stored in the plate as in a store. The image can be displaced to read locations for reading purposes by means of the displacement means. Reading will notably be effected electrically, so an electrical signal is produced which is available for further processing and/or transport. The major advantage of the device according to the invention is that the image conversion and the storage function as well as the scanning function are thus combined in one unit. As a result, the assembly is compact and has a simple construction. The image can be retained in the domain pattern (image store). This is possible even after reading if the image is reintroduced on the other end of, for example, a line during the reading process, so that the image circulates like in a delay line. This is a store, of the light-write type.

As a result of the storage function of the plate of magnetic material, the applied image can already be replaced by a subsequent image during the reading (for example, for transmission). Consequently, successive carriers of image information can be transmitted directly one after the other, without (transmission) time being lost for the exchange of carriers of image information.

Reading can be effected at any desired speed, within the possibilities of the domain displacement speeds, so that the adaptation to systems for processing and/or transmitting the image information obtained does not involve problems. Finally, it is to be noted that by means of the present scanning methods (cathode ray tube etc.) at the most approximately 1,000 × 1,000 image points can be realized for an entire screen. Using the set-up according to the invention, a larger number of image points can be realized per unit of surface area, for example, 1,000 × 1,000 per 2 $cm^2$, so that the resolution is also higher for a corresponding format of the converting device.

There are two known methods of influencing domains in a plate of magnetic material by means of heat. The first method is the heating of the material to a temperature in the vicinity of the compensation point, so that at the area of heating a domain is spontaneously produced (the plate is then continuously present in the magnetic field in the magnetization direction). Consequently, when applied in the device according to the invention, this method results in an image in the form of a generated domain pattern. The second method is the heating of the material to a temperature in the vicinity of the Curie point, so that domains present at the area of heating disappear. Consequently, when applied in the device according to the invention, comprising means for filling the magnetic plate with domains, this method results in an image in the form of a lost-domain pattern.

All kinds of embodiments of the device according to the invention are feasible. All methods and means of domain displacement can be used for the effective processing of the pattern obtained, notably reading. An example of a device in which the plate of magnetic material on which imaging takes place can be fully independent will be separately described. This device is characterized in that the domain displacement means consist of a second plate of magnetic material which contains domains and in which domain paths are provided along which the domains in the second plate can be displaced, and in which interaction between the domains in the second plate and the domains of the domain pattern in the said plate enables simultaneous displacement of the latter domains for reading purposed. It is to be noted that this phenomenon and the use of the interaction between domains in different plates are the subject of a previously filed application, cf. U.S. application Ser. No. 277,150, filed Aug. 2, 1972.

The invention will be described in detail hereinafter with reference to the embodiments shown in the Figures. It is to be emphasized that the invention is not restricted to the said embodiments.

Figure 2:
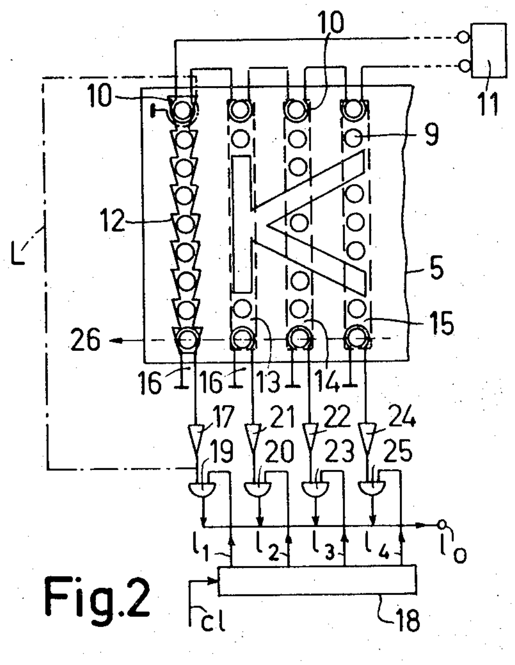
Figure 3:
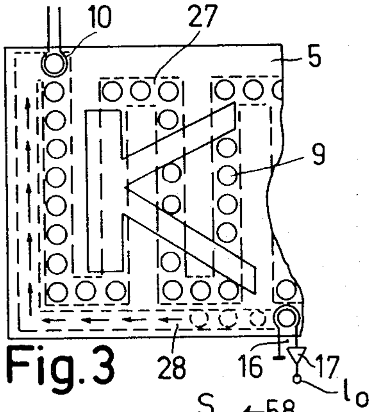
Figure 4:
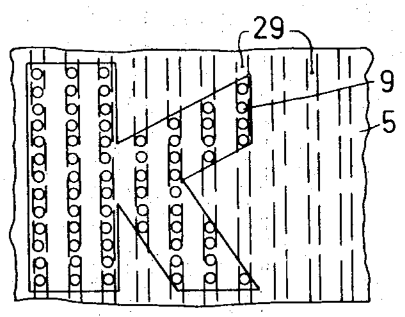
Figure 5:
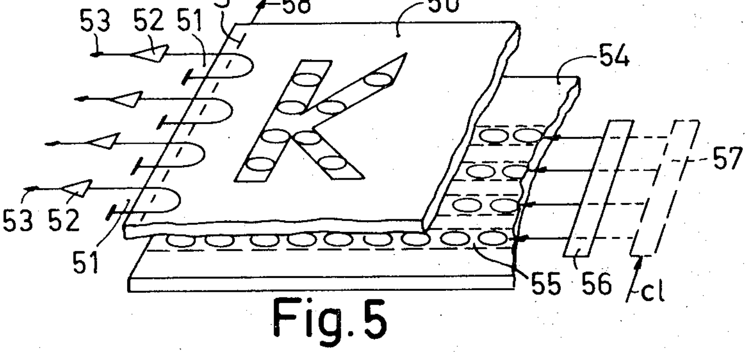

FIG. 1 is a diagrammatic representation of a set-up of the device according to the invention, FIGS. 2, 3 and 4 show different possibilities for the plate of magnetic material, and FIG. 5 shows the plate with a second plate of magnetic material, interaction occurring between the domains in the two plates.

The reference 1 in FIG. 1 denotes a carrier on which an image is provided. The image is exposed to the light of a light source 2 via a lens system 3. In this example, the image informatin is imaged in the form of more or less light, via a lens system 4, for a brief period of time onto a plate of magnetic material 5 by reflection (transmitted light can also be used). This material is situated in a magnetic main field H. Domains in the plate have a magnetic field *h*, which opposes the main field H. In an arrangement of this kind, the plate areas corresponding to bright parts of the image will be exposed to a beam of high intensity. The said areas will obtain a higher temperature, with the result that the magnetization factor $M_s$ changes. In the one case (compensation point), domains will appear at these areas, whilst in the other case (Curie point) domains will disappear at these areas. The reference 6 in FIG. 1 symbolically denotes that means are provided for the displacement of the domains pattern thus obtained for reading purposes. The magnetic information will then generally be converted into electrical information which appears on an output 7. Further details can be derived from the other Figures. The reference 8 in FIG. 1 indicates that, if necessary, means can be provided to ensure that the plate 5 is exposed to the light at an area of the correct temperature. The necessity of temperature control using means 8 is dependent of the relevant material and the method used (see above).

FIG. 2 is a detailed view of the plate 5 containing the image information in the form of a lostdomain pattern. Initially, the plate 5 was completely filled with domains 9. This is effected in known manner, for example, by means of wire loops 10 which generate domains 9 by means of a pulse current from a source 11. In this case parallel domains paths 12 to 15 are provided which are fully occupied by domains. In this example, a guide structure in the form of a so-termed angelfish structure is shown (at the left) as a domain path 12. Such a structure can be made of permalloy and can be arranged on or near the plate 5. The displacement of the domains over this structure is effected by varying the main field H (FIG. 1). This and other displacement techniques are known from literature and need not be described in this context.

In this case, the operation takes place in the vicinity of the Curie point. The light which is reflected or transmitted by an image causes disappearance of the domains at the corresponding areas on the guide structure. A domain pattern appears which constitutes the black/white image. Consequently, in this case the "K" is a form of white image information.

Which shades of grey will be evaluated as white or black (i.e., domain absent and domain present, respectively) depends on the light intensity. Thresholds can be introduced for this purpose.

As a result of the stability of the domains, the image will be maintained after the applied image has been removed. It is to be noted that the application of image information by means of the light from the light sources 2 may last only as long as is required to form a black/white image (for example, in the order of 1 $\mu$s. If this duration is too long, the image will become "vauge" because the areas surrounding the heated areas will then also be heated and it may be that at these surrounding areas domains are generated (compensation point method) or disappear (Curie point method), respectively.

In the example of FIG. 2, the magnetic image information is read as follows, particularly if the number of image points is not too large: the domain guide paths 12, 13, . . . can be read one after the other. To this end, individual variation of the main field H (FIG. 1) must be possible per path 12, 13 . . . This can be realized by means of an auxiliary field H′ (not shown) per path. Assume that path 12 is read: the information in this path arrives on a path output 16 and is electrically detected and amplified in the detector amplifier 17. A path number counter 18, driven by a clock signal C1, is in the position corresponding to path 12 and applies, via line $1_1$, an "open" signal to the ANDfunction gate 19 which thus applies the information of path 12 to output line 10. The open signal can also provide the switching on of the varying auxiliary field H′ for path 12. In this example the information is, for example, 111111111. Subsequently, the counter 18 is set to the position corresponding to path 13: L2, applies an open signal to the gate 20, and ensures that the auxiliary field H′ for path 13 is switched on. The information 110000011 then arrives at the detector amplifier 21 and, via the gate 20, on the output 10. Subsequently, the same takes place with the information 111010111 of path 14, via detector 22 and the gate 23 which is opened via line L3. The same applies to the information 110111011 of path 15 via detector 24 and the gate 25 which is opened via line L4.

In this manner the image information appears on the output 10 in the form of a series-digital signal. This signal is directly suitable for image telegraphy (facsimile).

In the configuration shown in FIG. 2, the reading can be effected in an even simpler manner, notably for image converters for a large number of image points: the image information is shifted in the direction of the path outputs 16 one line after the other (in this case horizontally) by variation of the main field H. If a given line is ready on the outputs 16, the relevant information of one area of each path can be successively read. The same counter 18 can now serve for the successive opening of the gates 19, 20 etc., (The clock frequency can then be higher). The digital image information does not appear column after column on line 10 in this case, but one line after the other. So in this case: lower line: 1111, subsequently 1111, then 1010, and 1001, etc. Particularly in cases where there are many image points and hence many columns in this example, it is advantageous not to have a read location per column, but to let one location suffice.

In reading of each line, the (in this case) lowest line on only one output 26 can be effected, while omitting the elements 15 to 25, if this last line, plate 5 is in addition configured as a transverse (in this case horizontal) domain register. In this case, the shifting of the line information to the output 26 could be effected by means of an electrical guide loop structure or a permalloy structure other than that in the columns themselves. The digital image information, of course, then has the same shape as with the described (horizontal) line reading. The stroke-dot line L of FIG. 2 will be discussed hereinafter in the description of the circulation of the information in the device.

FIG. 3 shows an embodiment of the plate 5 which differs slightly as regards the displaceability of the generated-domain pattern (compensation point method). An uninterrupted domain guide structure 27 (for example, a T-bar structure in which the domain is displaced by means of a rotary field in the plane of the plate) which extends over the entire plate initially does not contain any domains. The thermal effect of the light carrying the image information again produces an image in the plate 5. Using the compensation point method, the domains appear at the areas of high light intensity.

consequently, the K appears as black image information in this example. The reading is then as follows: the information domain present or domain absent is shifted to output 16 via the path 27. In the detector amplifier 17, the information is converted into an electrical signal which is applied to the output line 10. The digital image information then appears all at once in series form on the output.

FIG. 3 also shows that the image pattern can be readily maintained in the domains after reading (circulating store). To this end, the path 27 is extended with a portion 28 which has the same structure and along which the domains, after having passed the read output 16, can be applied again to the beginning of path 27. The information pattern is retained because the guide structure ensures that there will be not incorrect shifts in the domain pattern itself.

A similar form of circulation is also possible in the embodiment shown in FIG. 2; a separate return path would then have to be provided for each path 12, 13, . . . It is to be noted that the said methods of returning domains can also be fully electrically performed gy generating a domain, appearing on an output 16 and electrically detected in 17 (etc.), directly via an electrical conductor at the beginning of the relevant path 15 (etc.), or 27 by means of, for example, an additional current loop. This is diagrammatically shown in FIG. 2 for one path (12) by means of a stroke-dot line L.

FIG. 4 shows that the image (K) itself can also arise in domains 9 in the paths 29. This is so in the case of white image information when use is made of the method of generating domains in the vicinity of the compensation point, or in the case of black image information when the method of making domains dissappear in the vicinity of the Curie point is used. This Figure also shows that an image (in this case a K character can generally occupy a large number of image points. The choice of the number of image points (divided into columns and lines) will depend on the nature of the practical applications.

FIG. 5 shows a part of the device according to the invention in which the plate of magnetic material 50 is accompanied by a second plate of magnetic material 54. No guide structures are provided near or on the plate 50. The plate 50 can be specially rendered suitable for the exclusive conversion of the image information into a domain pattern. It is again assumed that, by way of example, a white K is exposed. In the case of operation in the vicinity of the compensation point, domains will be generated in the pattern of the K. Conversely, a plate 50 which is completely filled with domains can also be used as a basis, a black K then being exposed in a white field and all domains disappearing except those situated in the pattern of the K in the case of operation in the vicinity of the Curie point. In this case the second plate 54 serves to transport the domain pattern which appears in plate 50 to a read location. This is effected by the interaction between domains in the second plate 54 and the domains present in the plate 50. To this end, the plate 54 can be provided with domain guide paths 55 which are completely filled with domains over their entire length. The paths 55 can be strips of permalloy without further structure. It is alternatively possible to provide the plate 54 with the desired paths 55 by scratching, C.f. U.S. application Ser. No. 294,651, filed Oct. 3, 1972. By continuously supplying the paths 55 with new domains from a source 56, all domains in a path are shifted further (in this case to the left). As a result of this shifting procedure, corresponding domains (in projection above the second plate 54) in plate 50 are taken along by interaction. The complete pattern can be simultaneously displaced: all paths 55 are then simultaneously supplied from 56. This can also be effected one line after the other (horizontally): a counter 57, supplied with a clock signal C1, designates a path 55 which is to be supplied from source 56. The further read procedure is as follows: the domains of the domain pattern of plate 50 arriving on the outputs 51 are detected and amplified in 52, after which the electrical information appears on outputs 53. Depending on the method of driving of the paths 55 in plate 54, a complete line (horizontal) will be read in succession and a series-digital output signal is obtained. The outputs 53 can be interconnected, or a whole column (vertical) will appear on outputs 51; these outputs can then be scanned in parallel or one after the other, for example, via a buffer register, so as to form a digital series-signal. It is alternatively possible to perform the read operation on the end (left) of the plate 50 in series form, one column after the other. This can be achieved inter alia by means of electrical guide loops which are arranged along the dotted line S. The information then appears on only one output 58. The transport of the image information to one output 58 can also be effected by means of the plate 54. If at the end (left) of the plate 54 the domains can yet be displaced transverse to the paths 55 in a path which is always completely filled with domains (not shown), the information of plate 50 is taken along in series form, one column after the other, and this information can be read on the output 58.

It is to be noted that the same means as described for the arrangements of FIGS. 2 and 3 can be used so as to enable the circulation of the domain pattern information in the arrangement of FIG. 5. That is to say, for example, return paths for the domains of plate 54 (compare return path 28 of FIG. 3) and/or of an electrical return of the domain pattern information (compare the line L of FIG. 2).

What is claimed is:

1. A device for converting image information into magnetic information. comprising a light source for projecting an image of the image information onto a plate of magnetic material which is suitable to accommodate domains to produce therein a domain pattern by the thermal action of the incident light corresponding to said image of the image information, and means for displacing domains to thereby read said image information stored in said plate.

2. A device as claimed in claim 1, wherein said magnetic material has a compensation temperature to which the local heating by the light incident on the plate takes place whereby the domains are locally generated.

3. A device as claimed in claim 2 further including means for filling the plate of magnetic material with domains, the local heating by the incident light taking place in the vicinity of the Curie temperature of the magnetic material whereby the domains locally disappear.

4. A device as claimed in claim 1, wherein the domain displacement means consist of a second plate of magnetic material which contains domains and in which domain paths are provided along which the domains in the second plate can be displaced, interaction between the domains in the second plate and the domains of the domain pattern in the said plate enabling displacement of the domains in said plate for reading purposes.

5. A device as claimed in claim 1 including means for returning the pattern information from the outputs of the said plate to the inputs thereof whereby a circulating domain pattern is obtained which is an image of the image information in the said plate of magnetic materials.

* * * * *